(12) United States Patent
Michiguchi et al.

(10) Patent No.: US 12,220,825 B2
(45) Date of Patent: *Feb. 11, 2025

(54) DISPLAY APPARATUS

(71) Applicant: Panasonic Automotive Systems Co., Ltd., Kanagawa (JP)

(72) Inventors: Masayoshi Michiguchi, Kanagawa (JP); Tatsuto Ryugo, Tokyo (JP); Kenji Okano, Aichi (JP); Yukiko Kanno, Kyoto (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,914

(22) Filed: Jul. 31, 2024

(65) Prior Publication Data

US 2024/0383146 A1    Nov. 21, 2024

Related U.S. Application Data

(63) Continuation of application No. 18/300,012, filed on Apr. 13, 2023, which is a continuation of application
(Continued)

(30) Foreign Application Priority Data

Aug. 26, 2011   (JP) .................... 2011-184416
Aug. 26, 2011   (JP) .................... 2011-184419

(51) Int. Cl.
*B25J 9/16*   (2006.01)
*B25J 9/00*   (2006.01)
(Continued)

(52) U.S. Cl.
CPC ............. *B25J 9/1694* (2013.01); *B25J 9/161* (2013.01); *B25J 9/1666* (2013.01); *B25J 9/1679* (2013.01);
(Continued)

(58) Field of Classification Search
CPC ........ B25J 9/1694; B25J 9/161; B25J 9/1666; B25J 9/1679; B25J 19/023; B25J 9/0003;
(Continued)

(56) References Cited

U.S. PATENT DOCUMENTS 7,161,616 B1    1/2007 Okamoto et al.
2005/0270500 A1*  12/2005 Ito ............................ B60R 1/27
                                                            353/99

(Continued)

FOREIGN PATENT DOCUMENTS

EP    1916846 A1    4/2008
EP    2207350 A1    7/2010
(Continued)

OTHER PUBLICATIONS

International Search Report for Application No. PCT/JP2012/005321 dated Nov. 27, 2012.
(Continued)

*Primary Examiner* — John W Miller
*Assistant Examiner* — Omer Khalid
(74) *Attorney, Agent, or Firm* — McDonald Hopkins LLC

(57) ABSTRACT

A driving assistance apparatus is provided in which the detection range of a left-front-corner sonar (12a) located at the vehicle's left front corner is included in the field of view of a second imaging means (14) located at the vehicle's left front corner. When the left-front-corner sonar (12a) detects a three-dimensional object at the vehicle's left front corner, an image processing means (3) synthesizes an image of the image created using a second imaging means (14) and the images created with four cameras (7a-7d) for imaging the complete periphery of the vehicle, and creates a bird's-eye-view image (40b). The detection range of the left-front-
(Continued)

corner sonar (12a) is included within a region of the bird's-eye image (40b) on the basis of the image created with the second imaging means (14).

20 Claims, 14 Drawing Sheets

Related U.S. Application Data

No. 17/194,595, filed on Mar. 8, 2021, now Pat. No. 11,657,618, which is a continuation of application No. 16/263,159, filed on Jan. 31, 2019, now Pat. No. 10,970,562, which is a continuation of application No. 14/241,735, filed as application No. PCT/JP2012/005321 on Aug. 24, 2012, now Pat. No. 10,235,575.

(51) Int. Cl.
    *B25J 19/02*     (2006.01)
    *B60R 1/00*      (2022.01)
    *B60R 1/27*      (2022.01)
    *G01S 15/931*    (2020.01)
    *G06V 20/56*     (2022.01)
    *H04N 5/262*     (2006.01)
    *H04N 7/18*      (2006.01)
    *H04N 23/90*     (2023.01)

(52) U.S. Cl.
    CPC ............... *B25J 19/023* (2013.01); *B60R 1/00* (2013.01); *B60R 1/27* (2022.01); *G01S 15/931* (2013.01); *G06V 20/56* (2022.01); *H04N 5/2624* (2013.01); *H04N 7/181* (2013.01); *H04N 23/90* (2023.01); *B25J 9/0003* (2013.01); *B60R 2300/105* (2013.01); *B60R 2300/20* (2013.01); *B60R 2300/301* (2013.01); *B60R 2300/607* (2013.01); *B60R 2300/802* (2013.01)

(58) Field of Classification Search
    CPC ....... B60R 1/00; B60R 1/27; B60R 2300/105; B60R 2300/20; B60R 2300/301; B60R 2300/607; B60R 2300/802; G01S 15/931; G06V 20/56; H04N 5/2624; H04N 7/181; H04N 23/90
    USPC .......................................... 348/148
    See application file for complete search history.

(56) References Cited

U.S. PATENT DOCUMENTS

| | | | |
|---|---|---|---|
| 2006/0088190 A1 | 4/2006 | Chinomi | |
| 2008/0198226 A1* | 8/2008 | Imamura | G06V 20/58 |
| | | | 348/148 |
| 2013/0057689 A1* | 3/2013 | Barth | H04N 7/181 |
| | | | 348/148 |
| 2013/0194426 A1* | 8/2013 | Schofield | B60R 1/23 |
| | | | 348/148 |

FOREIGN PATENT DOCUMENTS

| | | | |
|---|---|---|---|
| JP | 2003-169323 A | | 6/2003 |
| JP | 2004-026012 A | | 1/2004 |
| JP | 2006-121587 A | | 5/2006 |
| JP | 2006-199191 A | | 8/2006 |
| JP | 2007104373 A | * | 4/2007 |
| JP | 2008-195268 A | | 8/2008 |
| JP | 2008-205914 A | | 9/2008 |
| JP | 2011-077806 A | | 4/2011 |
| WO | 00/064175 A1 | | 10/2000 |

OTHER PUBLICATIONS

The Extended European Search Report for Application No. EP12827913 dated Jul. 10, 2014.

* cited by examiner

DISPLAY APPARATUS

CROSS REFERENCE TO RELATED APPLICATIONS

This is a continuation of U.S. patent application Ser. No. 18/300,012 filed on Apr. 13, 2023, which is a continuation of U.S. patent application Ser. No. 17/194,595 filed on Mar. 8, 2021, which is a continuation of U.S. patent application Ser. No. 16/263,159 filed on Jan. 31, 2019, which is a continuation of U.S. patent application Ser. No. 14/241,735 filed on Feb. 27, 2014, which is the national phase of PCT Application No. PCT/JP2012/005321 filed on Aug. 24, 2012, which claims priority from Japanese Patent Application No. 2011-184416 filed on Aug. 26, 2011 and Japanese Patent Application No. 2011-184419 filed on Aug. 26, 2011. The contents of all of these applications are incorporated by reference herein in their entireties.

TECHNICAL FIELD

The present invention relates to a drive assistance apparatus that gives notice of a potential collision with an obstacle during parking.

BACKGROUND ART

Hitherto, there is a known drive assistance apparatus that combines images captured using a plurality of cameras into an all-around view image indicating the all-around view of a vehicle and displays the combined image to assist driving (see Patent Literature (hereinafter, referred to as "PTL") 1, for example).

However, the all-around view image is created by combining the camera images projected onto a road surface position, so that a three-dimensional object disappears (dead angle) at a junction boundary between adjacent cameras. In general, the junction boundary between the camera images is set in the vicinity of four corners of a vehicle due to restrictions such as the installation of position of the camera or the angle of view of the camera, or the density of pixels. Such four corners of the vehicle are also likely to become blind zones of the visually observable area of the driver. For this reason, the deriver may continue driving without realizing the three-dimensional object in the vicinity of the junction boundary and thus cause a collision between the vehicle and the three-dimensional object.

In order to solve such a problem, in the related art, the position or angle of the junction boundary between camera images is changed in association with a sonar unit, a gear, or the like (see PTL 2 and PTL 3, for example).

CITATION LIST

Patent Literature

PTL 1
International Publication No. WO 00/64175
PTL 2
Japanese Patent Application Laid-Open No. 2007-104373
PTL 3
Japanese Patent Application Laid-Open No. 2006-121587

SUMMARY OF INVENTION

Technical Problem

However, with the technique of the related art, there is a problem in that a blind spot still exists in the close proximity of the vehicle (a distance within a few tens of centimeters from the vehicle). In particular, there is a concern that a driver may not realize the presence of the three-dimensional object due to the disappearance of the three-dimensional object on the bird's-eye view image although the presence of the three-dimensional object has been detected by the sonar unit, for example.

An object of the present invention is thus to provide a drive assistance apparatus capable of preventing a three-dimensional object from disappearing in the close proximity of a vehicle in a bird's-eye view image although the three-dimensional object has been detected.

Solution to Problem

In a drive assistance apparatus according to an aspect of the present invention, a sensor includes a detection range that is within the angle of view of a second imaging section, and when the sensor detects a three-dimensional object, an image processing section creates a bird's-eye view image by combining an image captured by the second imaging section and images captured by a first imaging section and sets the detection range of the sensor to be within a region of the bird's-eye view image based on the image captured by the second imaging section in the bird's-eye view image.

Advantageous Effects of Invention

According to the drive assistance apparatus of the present invention, it is possible to prevent a three-dimensional object from disappearing in the close proximity of a vehicle in a bird's-eye view image although the three-dimensional object has been detected, and thus to bring about the effect of making it easier for the driver to realize the three-dimensional object in the close proximity of the vehicle.

DESCRIPTION OF EMBODIMENTS

Embodiment 1

Hereinafter, a drive assistance apparatus according to Embodiment 1 of the present invention will be described with reference to the accompanying drawings. Meanwhile, in the present embodiment, a vehicle having a steering wheel on its right side will be described as an example. In a case of a vehicle having a steering wheel on its left hand side, the left and right are reversed.

Figure 1:
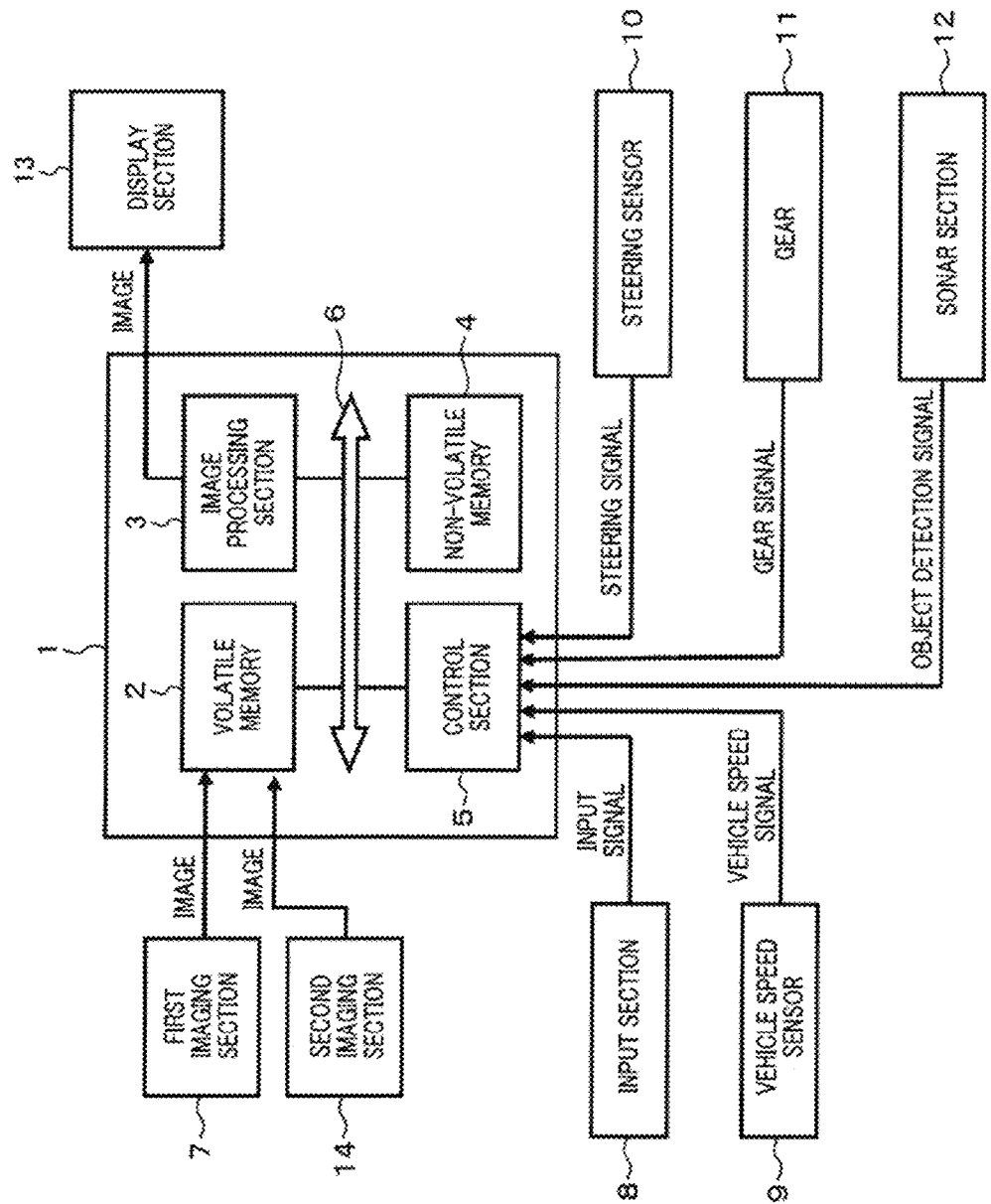
FIG. 1 is a block diagram illustrating a configuration of a drive assistance apparatus according to Embodiment 1 of the present invention.

FIG. 1 is a block diagram illustrating a configuration of a drive assistance apparatus according to Embodiment 1 of the present invention.

In FIG. 1, drive assistance apparatus 1 includes an imaging electric control unit (ECU) configured to perform image processing and includes volatile memory 2, image processing section 3, non-volatile memory 4, control section 5, and bus 6 for connecting these components to each other. Drive assistance apparatus 1 is connected to first imaging section 7, input section 8, vehicle speed sensor 9, steering sensor 10, gear 11, sonar section 12, display section 13, and second imaging section 14. Drive assistance apparatus 1 may include input section 8, vehicle speed sensor 9, steering sensor 10, gear 11, sonar section 12, display section 13, and second imaging section 14. Meanwhile, steering sensor 10 and a steering signal which are illustrated in FIG. 1 may also be referred to as "steering angle sensor 10" and a "steering angle signal," respectively.

Volatile memory 2 includes a video memory or a random access memory (RAM), for example. Volatile memory 2 is connected to first imaging section 7. In addition, volatile memory 2 is connected to second imaging section 14. Volatile memory 2 temporarily stores image data items obtained from captured images which are received from first imaging section 7 and second imaging section 14 at every predetermined time. The image data items stored in volatile memory 2 are output to image processing section 3 through bus 6.

Image processing section 3 includes an application specific integrated circuit (ASIC) or very large scale integration (VLSI) chip, for example. Image processing section 3 is connected to display section 13. Image processing section 3 performs the conversion of a viewpoint on the image data items which are received from volatile memory 2 and creates a bird's-eye view image in which the image data items received from non-volatile memory 4 are superimposed on each other, at every predetermined time. Image processing section 3 may create a combined image in which ordinary images without conversion of a viewpoint are arranged as the bird's-eye view image. The technique disclosed in International Publication No. WO 00/64175 can be used as a method of converting a viewpoint, for example.

Image processing section 3 outputs the combined images which are created at every predetermined time as display images to display section 13.

Non-volatile memory 4 includes a flash memory or a read only memory (ROM), for example. Non-volatile memory 4 stores various image data items such as an image data of a vehicle for which the drive assistance apparatus is used (hereinafter, referred to as "host vehicle") and a data table regarding a display method in accordance with driving situations. The image data items stored in non-volatile memory 4 are read out in response to a command of control section 5, and is used for various image processing using image processing section 3.

Control section 5 includes a central processing unit (CPU) or large scale integration (LSI) chip, for example. Control section 5 is connected to input section 8, vehicle speed sensor 9, steering sensor 10, gear 11, and sonar section 12. Control section 5 controls the image processing of image processing section 3, data read out from volatile memory 2 or non-volatile memory 4, input from first imaging section 7 or second imaging section 14, and output to display section 13 on the basis of various signals input from input section 8, vehicle speed sensor 9, steering sensor 10, gear 11, and sonar section 12.

First imaging section 7 includes four cameras. On the other hand, second imaging section 14 includes one camera. First imaging section 7 and second imaging section 14 input images captured at every predetermined time to volatile memory 2 of drive assistance apparatus 1. First imaging section 7 is mounted to a vehicle body so as to be capable of capturing images of all-around view of a host vehicle. In addition, second imaging section 14 is installed at a left front corner of the vehicle. The positions at which first imaging section 7 and second imaging section 14 are mounted to the vehicle body will be described below.

Figure 2:
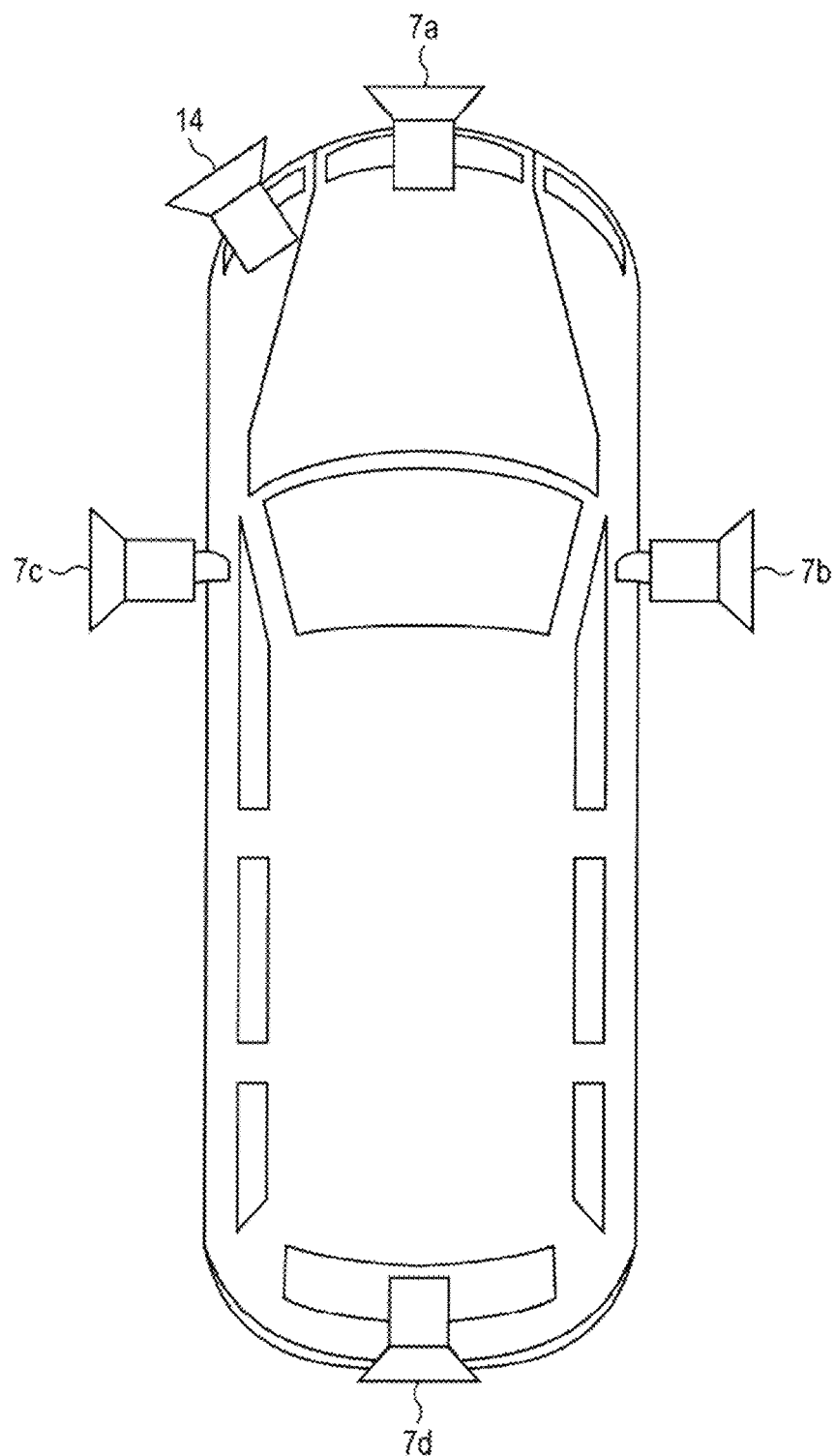
FIG. 2 is a diagram illustrating the positions at which first and second imaging sections are mounted to a vehicle according to Embodiment 1 of the present invention.

FIG. 2 is a diagram illustrating the positions at which first imaging section 7 and second imaging section 14 are mounted to a vehicle. As illustrated in FIG. 2, first imaging section 7 includes front camera 7a, right camera 7b, left camera 7c, and rear camera 7d. For example, front camera 7a and rear camera 7d are mounted to the front and rear bumpers of the vehicle body, respectively. For example, right camera 7b and left camera 7c are mounted to the lower portions of right and left door mirrors of the host vehicle. On the other hand, second imaging section 14 is mounted to the left front corner of the host vehicle.

Input section 8 includes a touch panel, a remote controller, or a switch, for example. When input section 8 is formed of a touch panel, the input section may be provided to display section 13.

Vehicle speed sensor 9, steering sensor 10, gear 11, and sonar section 12 output a vehicle speed signal indicating the vehicle speed of the host vehicle, a steering angle signal indicating a steering angle, a gear signal indicating the state of a shift lever, a detected signal and distance signal of a three-dimensional object to control section 5, respectively. Sonar section 12 includes eight sonar units which are mounted to four places of four corners of the vehicle body of the host vehicle and four places of the front and back of the vehicle body, respectively. The positions at which the sonar units of sonar section 12 are mounted to the vehicle body will be described below.

Figure 3:
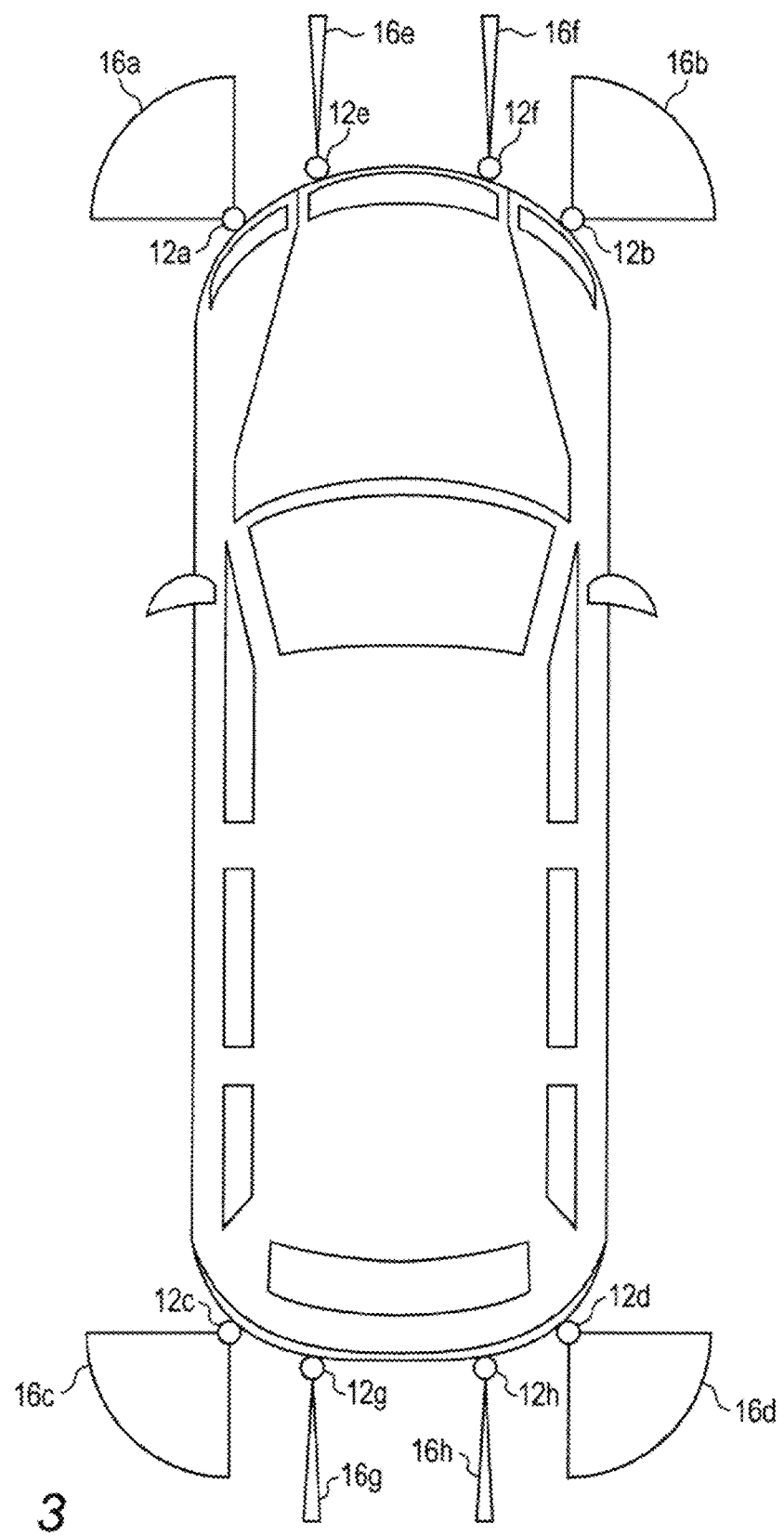
FIG. 3 is a diagram illustrating the positions at which sonar units are mounted to a vehicle according to Embodiment 1 of the present invention.

FIG. 3 is a diagram illustrating the positions at which the sonar units of sonar section 12 are mounted to a vehicle. As illustrated in FIG. 3, sonar section 12 includes left front corner sonar unit 12a, right front corner sonar unit 12b, left rear corner sonar unit 12c, right rear corner sonar unit 12d, left front sonar unit 12e, right front sonar unit 12f, left rear sonar unit 12g, and right rear sonar unit 12h. As illustrated in FIG. 3, respective horizontal detection ranges 16e to 16h of left front sonar unit 12e, right front sonar unit 12f, left rear sonar unit 12g, and right rear sonar unit 12h are set to be narrower than respective horizontal detection ranges 16a to 16d of left front corner sonar unit 12a, right front corner sonar unit 12b, left rear corner sonar unit 12c, and right rear corner sonar unit 12d. Next, a relation between the detection range of left front corner sonar unit 12a and an angle of view of second imaging section 14 will be described.

Figure 4:
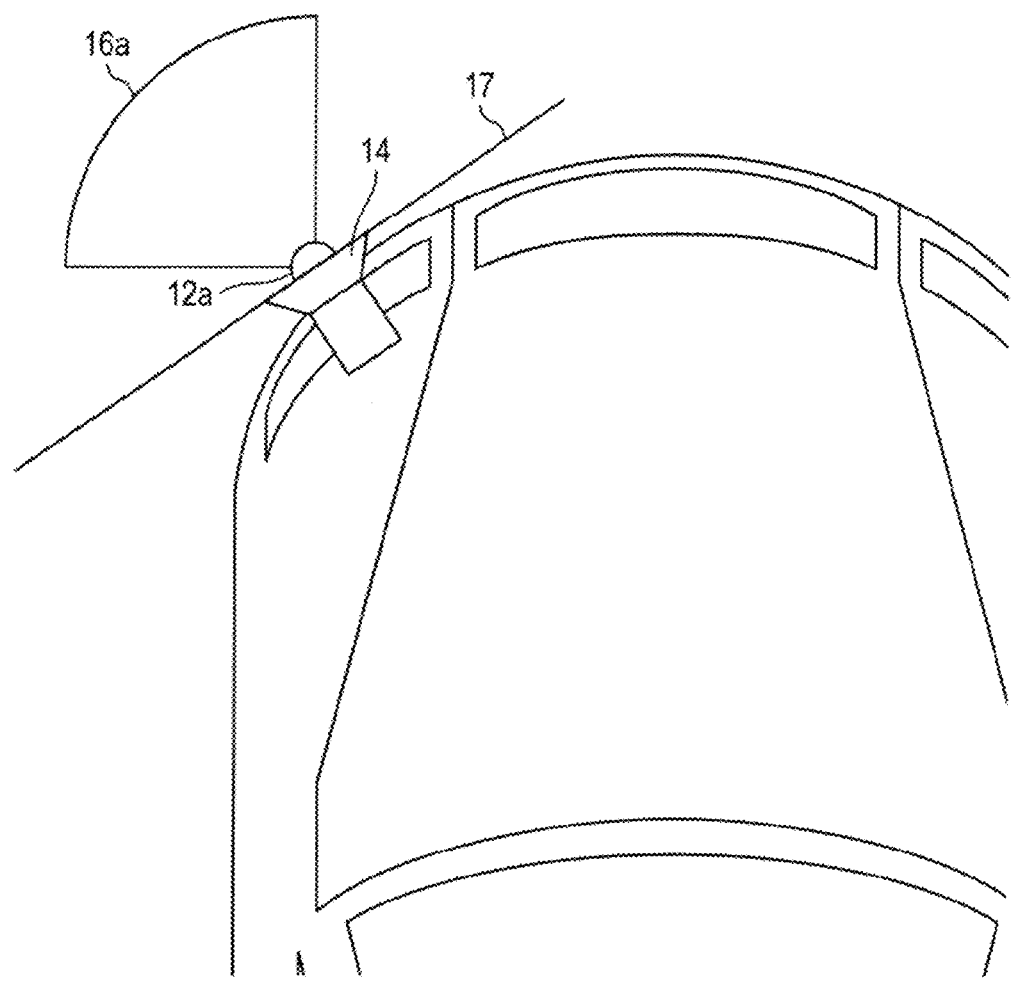
FIG. 4 is a diagram illustrating an angle of view of the second imaging section and a detection range of a sonar unit according to Embodiment 1 of the present invention in a horizontal plane.

FIG. 4 is a diagram illustrating the angle of view of second imaging section 14 and the horizontal detection range of left front corner sonar unit 12a. As illustrated in FIG. 4, the angle of view 17 of second imaging section 14 is set to approximately 180 degrees in a horizontal plane. In addition, detection range 16a of left front corner sonar unit 12a is included within the angle of view 17 of second imaging section 14. That is, the entirety of detection range 16a of left front corner sonar unit 12a is included within the angle of view 17 of second imaging section 14.

It is preferable that second imaging section 14 be mounted further upward of the vehicle body than left front corner sonar unit 12a. Thus, detection range 16a of left front corner sonar unit 12a has a tendency for being three-dimensionally included within the angle of view 17 of second imaging section 14. In addition, it is preferable that optical axes of second imaging section 14 and left front corner sonar unit 12a be substantially equal to each other. Accordingly, a deviation of detection range 16a of left front corner sonar unit 12a within angle of view 17 of second imaging section 14 becomes smaller, and thus it is possible to reduce a concern that detection range 16a of left front corner sonar unit 12a may partially protrude outside the angle of view 17 of second imaging section 14.

Display section 13 includes, for example, a navigation apparatus or a display section provided to a rear seat. Display section 13 displays a combined image input from image processing section 3. The combined image may be only a bird's-eye view image, or may be an image in which a bird's-eye view image and a normal image are arranged in parallel. When a blind spot is present in the vicinity of a boundary of the bird's-eye view image, a three-dimensional object disappears. Here, the three-dimensional object in this embodiment will be illustrated.

Figure 5:
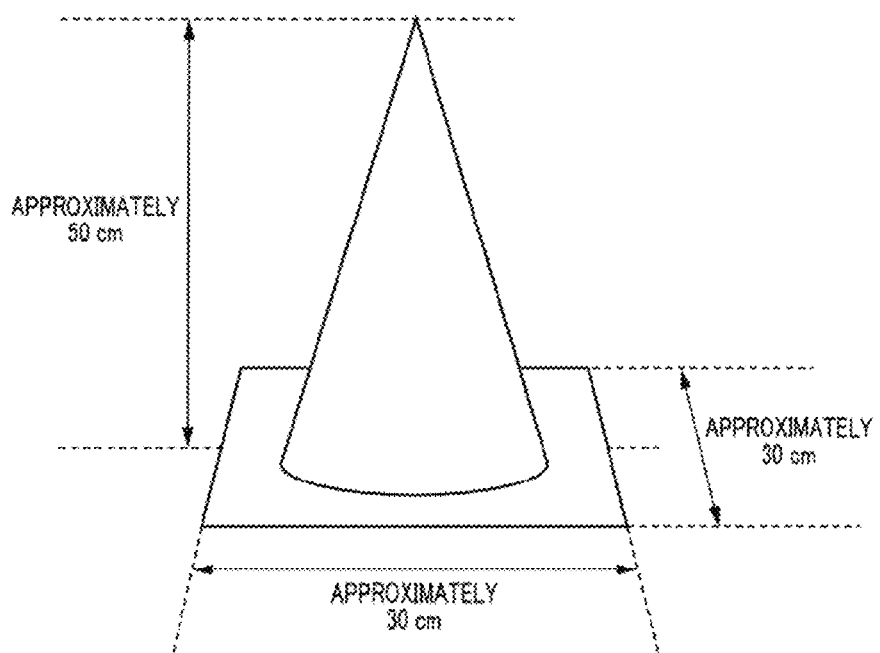
FIG. 5 is a diagram illustrating a three-dimensional object according to Embodiment 1 of the present invention.

FIG. 5 is a diagram illustrating a three-dimensional object in this embodiment. As illustrated in FIG. 5, Color Cone (registered trademark) having a width of approximately 30 cm, a depth of approximately 30 cm, and a height of approximately 50 cm is assumed to be the three-dimensional object in this embodiment. When half or more than half of Color Cone (registered trademark) disappears three-dimensionally on a bird's-eye view image, it means that a blind spot is present in the vicinity of a boundary of the bird's-eye view image.

Next, the drive assistance processing using control section 5 will be described.

Figure 6:
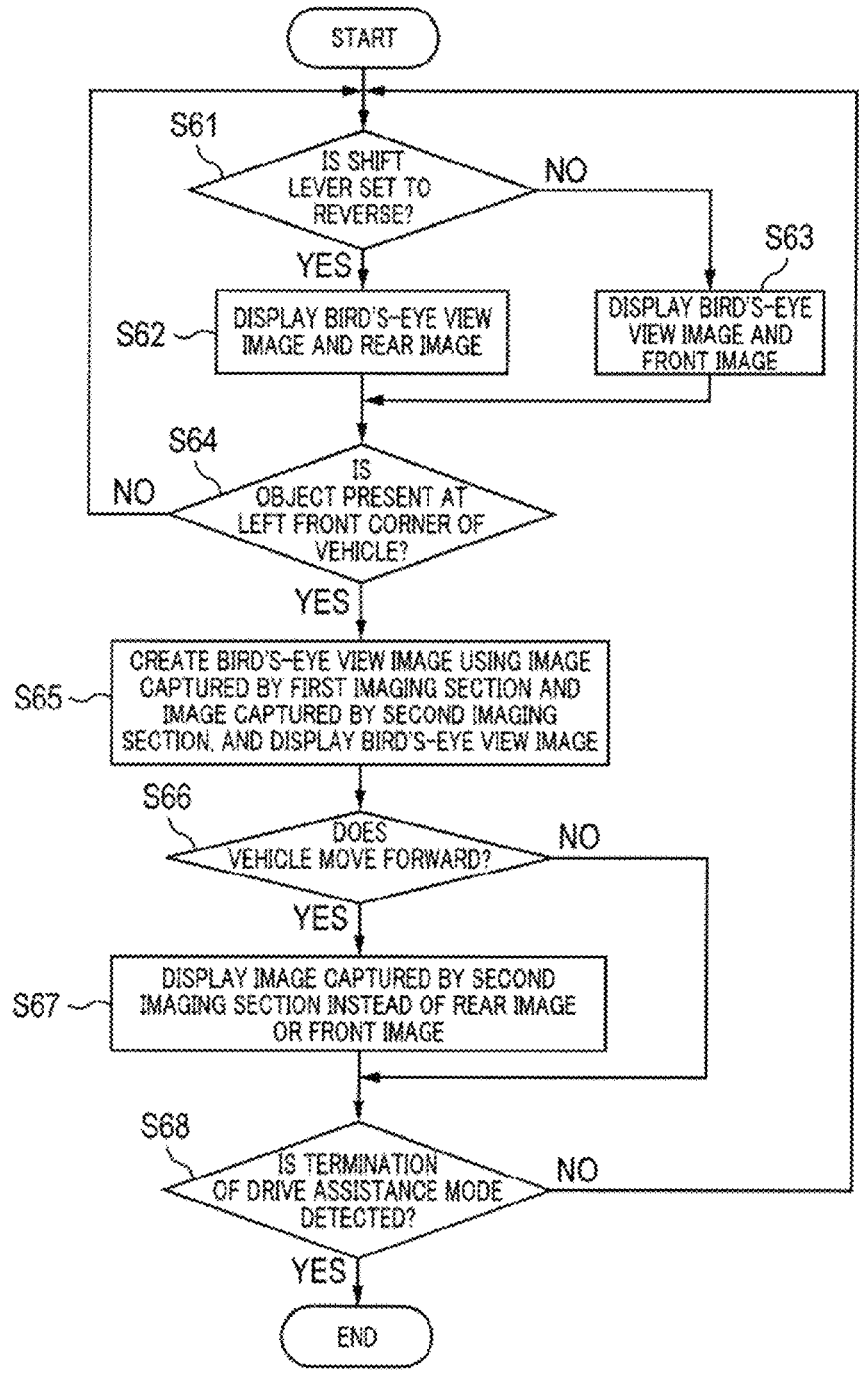
FIG. 6 is a flowchart illustrating drive assistance processing using the drive assistance apparatus according to Embodiment 1 of the present invention.

FIG. 6 is a flowchart illustrating the drive assistance process using control section 5.

First, as shown in step S61, control section 5 determines whether the shift lever is in a reversed state, on the basis of the gear signal input from gear 11.

In a case of YES in step S61, image processing section 3 creates a bird's-eye view image using an image captured by first imaging section 7 and acquired from volatile memory 2, in response to a command of control section 5. In addition, as shown in step S62, display section 13 displays the created bird's-eye view image in parallel with a rear image of rear camera 7d which is acquired from volatile memory 2.

Next, in a case of NO in step S61, as shown in step S63, image processing section 3 creates a bird's-eye view image using an image captured by first imaging section 7 and acquired from volatile memory 2, in response to a command of control section 5, and display section 13 displays the created bird's-eye view image in parallel with a front image of front camera 7a which is acquired from volatile memory 2.

Next, as shown in step S64, control section 5 determines whether a three-dimensional object is present at a left front corner of a host vehicle, on the basis of detected results of sonar section 12. That is, control section 5 determines whether left front corner sonar unit 12a has detected a three-dimensional object. In a case of NO in step S64, the processing of step S61 is performed again.

On the other hand, in a case of YES in step S64, as shown in step S65, image processing section 3 newly creates a bird's-eye view image using the image captured by first imaging section 7 and an image captured by second imaging section 14 and causes display section 13 to display the created bird's-eye view image. That is, only when left front corner sonar unit 12a detects a three-dimensional object, image processing section 3 creates a bird's-eye view image using images captured by four cameras 7a to 7d of first imaging section 7 and the image captured by second imaging section 14. Conversely, when left front corner sonar unit 12a has not detected the three-dimensional object located at the left front corner of the host vehicle, image processing section 3 creates the bird's-eye view image so far using only the images captured by four cameras 7a to 7d of first imaging section 7. Differences between the bird's-eye view image created in step S65 and an ordinary bird's-eye view image created by the images captured by four cameras 7a to 7d of first imaging section 7 will be described later.

Next, as shown in step S66, control section 5 determines whether the moving direction of the host vehicle is the forward direction. At this time, control section 5 specifies the moving direction of the host vehicle on the basis of the gear signal input from gear 11. That is, control section 5 determines from the gear signal whether the shift lever is set to the front.

In a case of YES in step S66, as shown in step S67, control section 5 causes display section 13 to display the image captured by second imaging section 14, instead of the rear image displayed in parallel on display section 13 by step S62 or the front image displayed in parallel on display section 13 by step S63.

After the processing of step S67, or in a case of NO in step S66, as shown in step S68, control section 5 determines whether the termination of a drive assistance mode has been detected. In a case of YES in step S68, control section 5 terminates the drive assistance processing. For example, when an input of the termination of the drive assistance mode is received from input section 8, control section 5 terminates the drive assistance processing. On the other hand, in a case of NO in step S68, control section 5 performs the processing of step S61 again.

Figure 7:
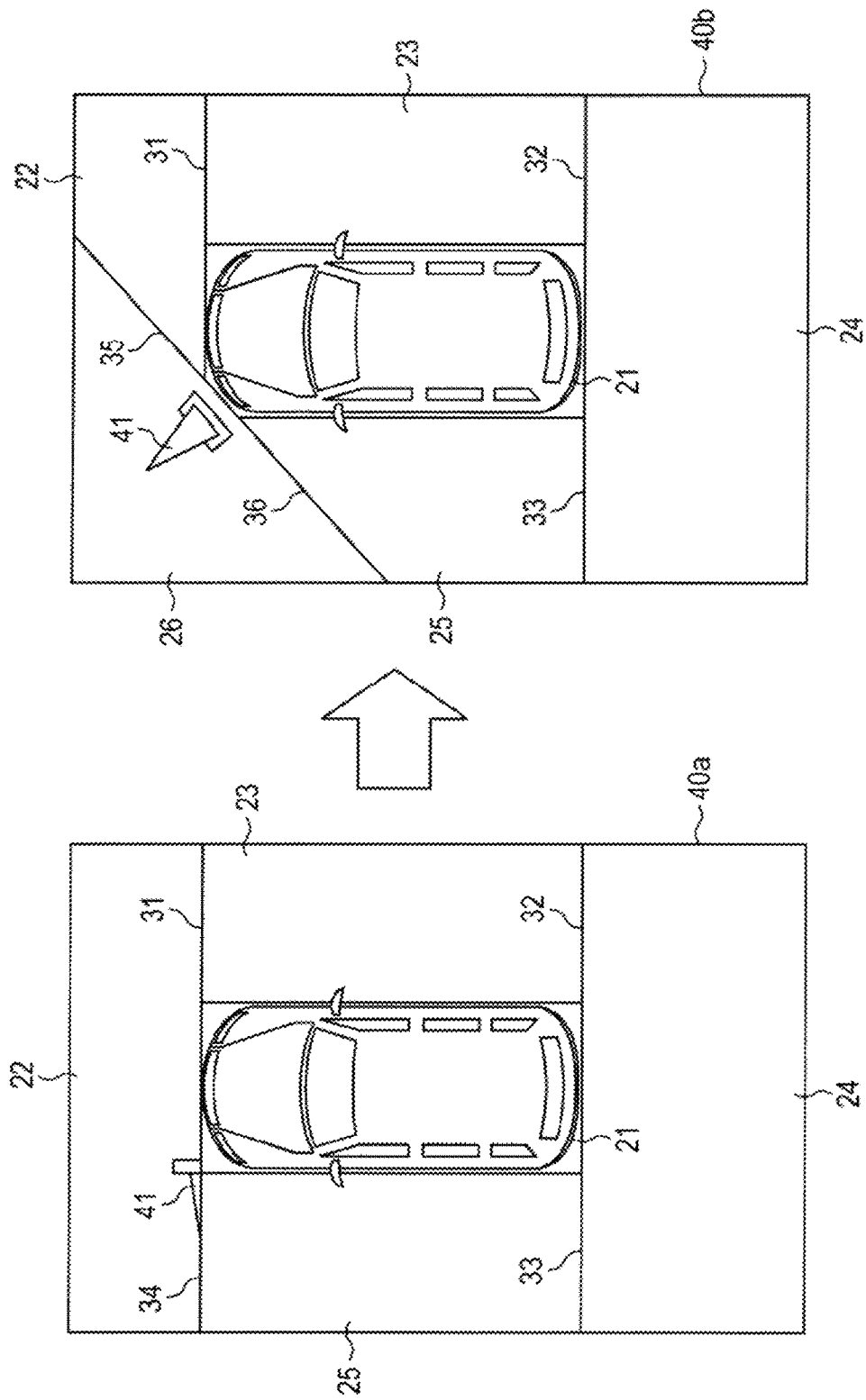
FIG. 7 is a diagram illustrating a bird's-eye view image created in step S65 of FIG. 6.

Next, a description will be given of differences between the bird's-eye view image created in step S65 when left front corner sonar unit 12a detects the three-dimensional object and an ordinary bird's-eye view image created by the images captured by four cameras 7a to 7d of first imaging section 7. FIG. 7 is a diagram illustrating the bird's-eye view image created in step S65, using an image.

As illustrated on the left side of FIG. 7, before left front corner sonar unit 12a detects a three-dimensional object, image processing section 3 creates bird's-eye view image 40a using the images captured by four cameras 7a to 7d of first imaging section 7. Image 21 of a host vehicle is superimposed on the center of bird's-eye view image 40a. Regions 22 to 25 of bird's-eye view image 40a correspond to viewpoint-converted images of the images captured by front camera 7a, right camera 7b, left camera 7c, and rear camera 7d, respectively. The junction surfaces of regions 22 to 25 are shown as combination boundaries 31 to 34, respectively. When left front corner sonar unit 12a detects three-dimensional object 41 in the vicinity of the host vehicle, a blind spot is generated at combination boundary 34 in the bird's-eye view image itself using the images captured by four cameras 7a to 7d of first imaging section 7, and thus three-dimensional object 41 disappears.

Consequently, when left front corner sonar unit 12a detects the three-dimensional object, as illustrated on the right side of FIG. 7, image processing section 3 creates bird's-eye view image 40b using not only the images captured by four cameras 7a to 7d of first imaging section 7 but also an image captured by second imaging section 14 that captures an image of the left front corner in which three-dimensional object 41 is detected. Regions 22 to 26 of bird's-eye view image 40b correspond to viewpoint-converted images of the images captured by front camera 7a, right camera 7b, left camera 7c, rear camera 7d, and second imaging section 14, respectively. Combination boundary 35 between front camera 7a and second imaging section 14 and combination boundary 36 between left camera 7d and second imaging section 14 are set to positions at which region 26 of the viewpoint-converted image of second imaging section 14 can include the detection range of left front corner sonar unit 12a. In other words, combination boundaries 35 and 36 are set outside the detection range of left front corner sonar unit 12a. Thus, three-dimensional object 41 detected by left front corner sonar unit 12a does not disappear in the vicinity of combination boundaries 35 and 36 in bird's-eye view image 40b, and the visibility of three-dimensional object 41 within region 26 is maintained. In particular, since a falling-down direction of three-dimensional object 41 in the vicinity of the combination boundary does not rapidly fluctuate, a driver can view three-dimensional object 41 without feeling a sense of discomfort. In addition, three-dimensional object 41 falls down in a direction which is radially away from the vehicle as a reference point, and thus it is possible to intuitively ascertain the position and direction of three-dimensional object 41.

Meanwhile, in order to set three-dimensional object 41 to be distant from combination boundaries 35 and 36 as far as possible, it is fundamentally preferable that combination boundaries 35 and 36 be set to be as close as possible to the angle of view of second imaging section 14. On the other hand, if combination boundaries 35 and 36 are set to be substantially equal to the angle of view of second imaging section 14, glare of the outside of the original angle of view may occur when second imaging section 14 deviates from its mounting position. For this reason, it is preferable that combination boundaries 35 and 36 be set to positions located approximately several degrees to tens of degrees inward with respect to the angle of view of second imaging section 14.

Figure 8:
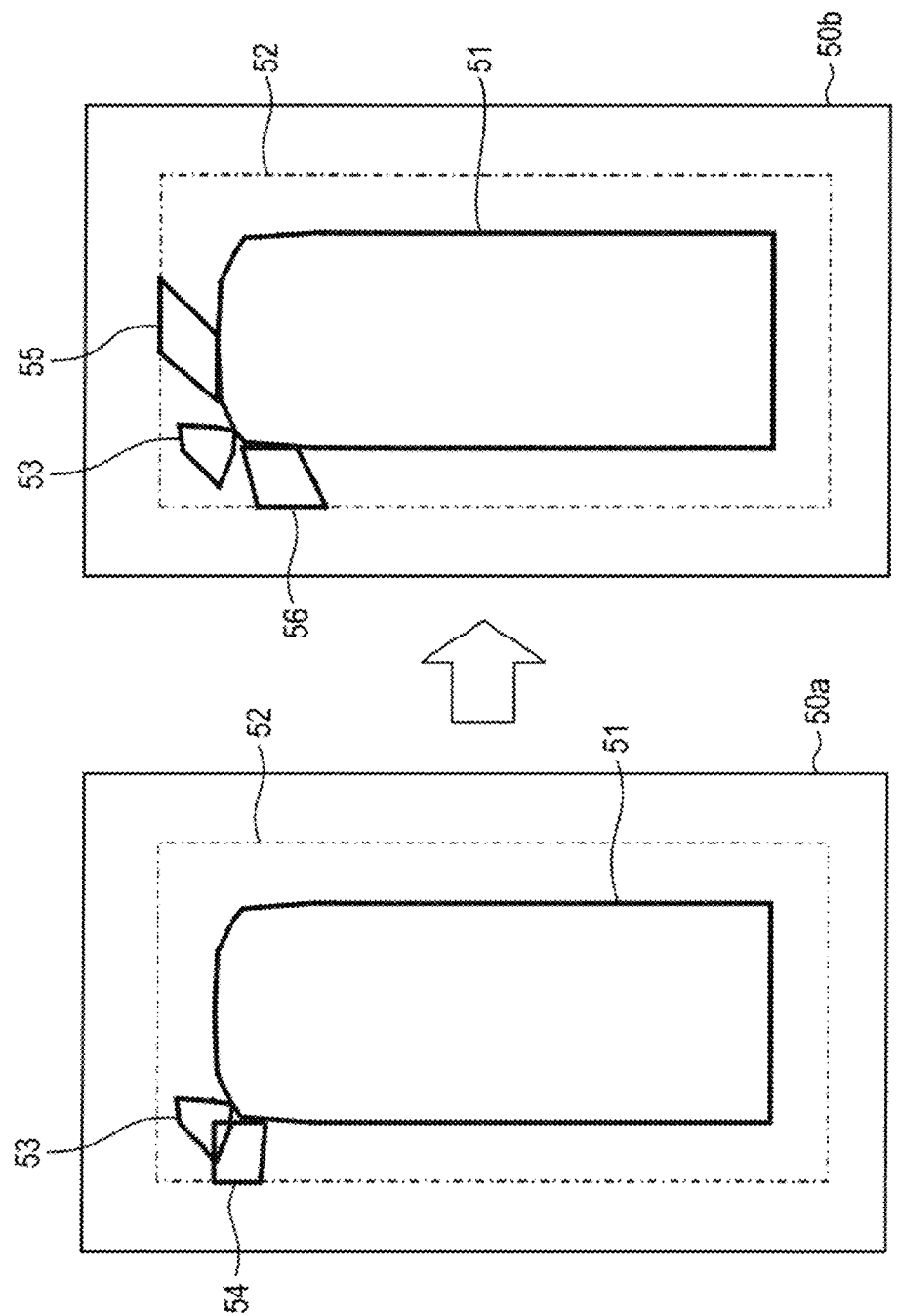
FIG. 8 is a diagram illustrating a blind spot region generated in the bird's-eye view image of FIG. 7.

Next, a blind spot region of the bird's-eye view image created in step S65 and a blind spot region of an ordinary bird's-eye view image created by the images captured by four cameras 7a to 7d of first imaging section 7 will be described. FIG. 8 is a diagram illustrating a dead angle region generated in the bird's-eye view image of FIG. 7.

Ordinary bird's-eye view image 50a created by the images captured by four cameras 7a to 7d of first imaging section 7 is illustrated on the left side of FIG. 8. Bird's-eye view image 50b created in step S65 is illustrated on the right side of FIG. 8. In bird's-eye view images 50a and 50b, a fixed range from host vehicle image 51 is set to blind spot measurement region 52. The fixed range is set to approximately several tens of cm. For example, the fixed range is set to 50 cm. This indicates a distance at which the host vehicle can move forward in a creeping manner at a speed of approximately 3 km/h and stop with sudden braking.

As illustrated on the left side of FIG. 8, in ordinary bird's-eye view image 50a created by the images captured by four cameras 7a to 7d of first imaging section 7, detection range 53 of left front corner sonar unit 12a partially overlaps blind spot region 54 caused by combination boundary 34 between front camera 7a and left camera 7c. When detection range 53 of left front corner sonar unit 12a overlaps blind spot region 54, three-dimensional object 41 disappears within the overlapping range. Consequently, in bird's-eye view image 50b created in step S65, combination boundaries 35 and 36 are kept away from detection range 53 of left front corner sonar unit 12a using the image captured by second imaging section 14. Thus, as illustrated on the right side of FIG. 8, in bird's-eye view image 50b created in step S65, detection range 53 of left front corner sonar unit 12a is separated from blind spot region 55 caused by combination boundary 35 between second imaging section 14 and front camera 7a and blind spot region 56 caused by combination boundary 36 between second imaging section 14 and left camera 7d so as not to overlap the blind spot regions. Accordingly, the three-dimensional object which is present in the detection range of left front corner sonar unit 12a is displayed on display section 13 without disappearing on bird's-eye view image 50b.

Figure 9:
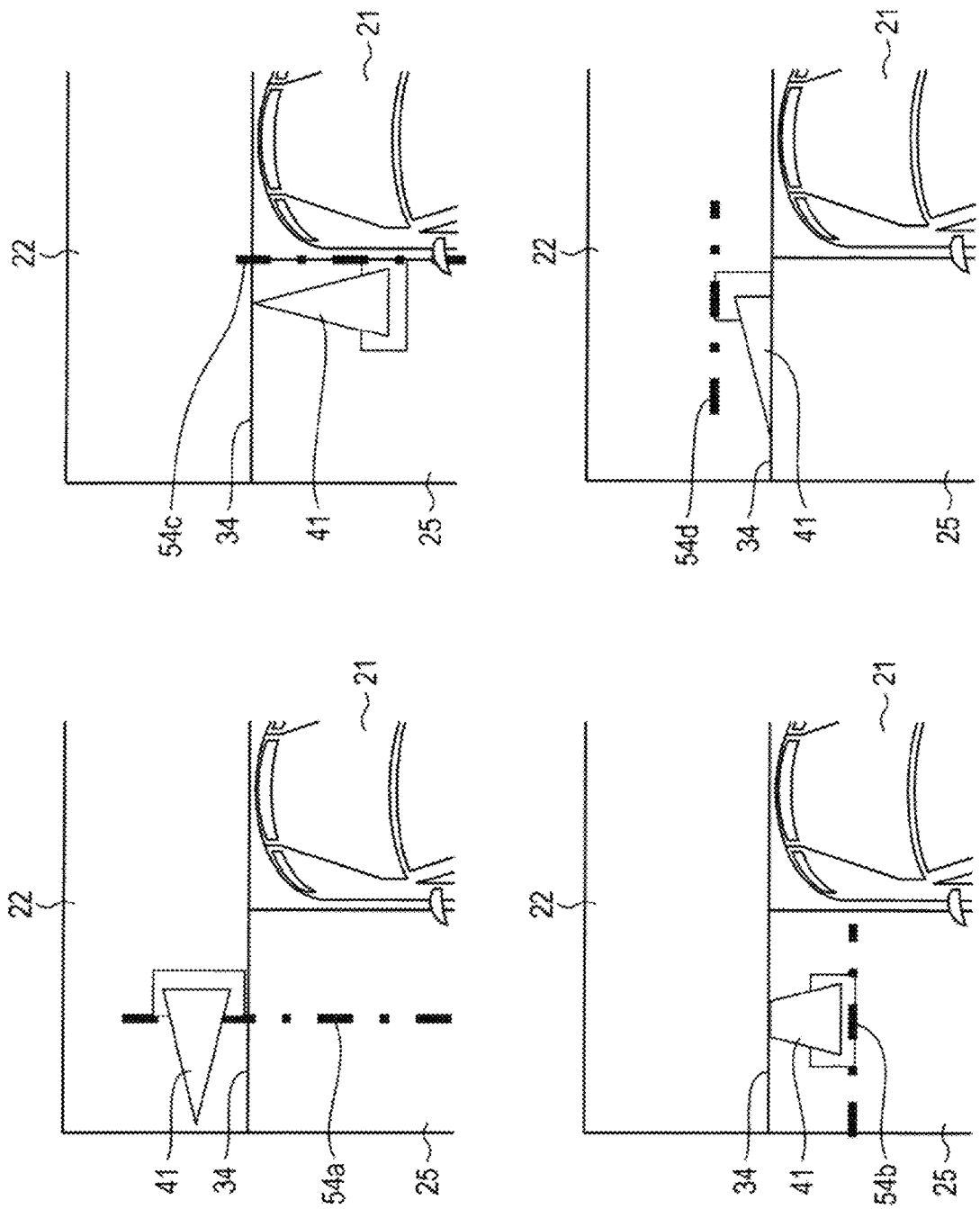
FIG. 9 is a diagram illustrating a boundary of the blind spot region of FIG. 8.

Next, a blind spot region caused by a combination boundary of the bird's-eye view image of FIG. 8 will be described. FIG. 9 is a diagram illustrating a boundary of the blind spot region of FIG. 8. In FIG. 9, an example of bird's-eye view image 50a on the left side of FIG. 8 will be described.

Boundary line 54a illustrated on the upper left side of FIG. 9 indicates a boundary of blind spot region 54 on the left side of the paper of FIG. 8. That is, boundary line 54a indicates an outer edge of dead angle measurement region 52.

Boundary line 54b illustrated on the lower left side of FIG. 9 indicates a boundary of blind spot region 54 on the lower side of the paper of FIG. 8. Boundary line 54b indicates a boundary at which a blind spot is generated when three-dimensional object 41 is present within region 25. When three-dimensional object 41 is moved to the upper side of the paper of FIG. 9 toward combined boundary 34 between front camera 7a and left camera 7d, half or more than half of three-dimensional object 41 disappears (25 cm or more) in a height direction. The lowermost position of three-dimensional object 41 in the paper of FIG. 9 serves as a component of boundary line 54b. Boundary line 54b is indicated by a set of the lowermost positions of three-dimensional object 41 in the sheet of FIG. 9 when gradually moving three-dimensional object 41 to the left side of the sheet of FIG. 9 to repeatedly perform the same processing.

Boundary line 54c illustrated on the upper right side of FIG. 9 indicates a boundary of blind spot region 54 on the right side of the sheet of FIG. 8. That is, boundary line 54c indicates an outer edge of host vehicle image 51.

Boundary line 54d illustrated on the lower right side of FIG. 9 indicates a boundary of blind spot region 54 on the upper side of the sheet of FIG. 8. Boundary line 54d indicates a boundary at which a blind spot is generated when three-dimensional object 41 is present within region 22. When three-dimensional object 41 is moved to the lower side of the sheet of FIG. 9 toward combination boundary 34 between front camera 7a and left camera 7d, half or more than half of three-dimensional object 41 disappears (15 cm or more) in a width direction. The uppermost position of three-dimensional object 41 in the sheet of FIG. 9 serves as a component of boundary line 54d. Boundary line 54d is indicated by a set of the uppermost positions of three-dimensional object 41 in the sheet of FIG. 9 when gradually moving three-dimensional object 41 to the left side of the sheet of FIG. 9 to repeatedly perform the same processing.

A similar method of determining a boundary is applied to blind spot regions 55 and 56 of bird's-eye view image 50b on the right side of FIG. 8, and thus the detailed description thereof will be omitted.

As described above, according to the present invention, the detection range of left front corner sonar unit 12a is included within the angle of view of second imaging section 14. Thus, when left front corner sonar unit 12a detects a three-dimensional object, image processing section 3 combines the image captured by second imaging section 14 and the images captured by four cameras 7a to 7d of the first imaging section to create bird's-eye view image 40b and sets the detection range of left front corner sonar unit 12a to be within a range of the bird's-eye view image based on the image captured by second imaging section 14 in bird's-eye view image 40b. That is, image processing section 3 moves a blind spot of the three-dimensional object outside the detection range of left front corner sonar unit 12a. Therefore, although left front corner sonar unit 12a detects a three-dimensional object, it is possible to prevent the three-dimensional object in the proximity of a host vehicle from disappearing on a bird's-eye view image of display section 13. In particular, in this embodiment, rather than all of the four corners of the host vehicle are set as positions where the three-dimensional object in the close proximity of the host vehicle may disappear on the bird's-eye view image, only the left front side, which is likely to become a blind spot to a driver in a case of a vehicle having a steering wheel on its right hand side. Thus, a selector is no longer necessary in drive assistance apparatus 1 which can only have a limited number of camera input ports, so that it is possible to prevent an increase in size of a control ECU of drive assistance apparatus 1 due to the selector.

Meanwhile, in the drive assistance processing illustrated in FIG. 6 of this embodiment, a bird's-eye view image and an ordinary image (a front image or a rear image) are displayed in parallel to provide a plurality of determination criteria to the driver to thereby improving the visibility of a three-dimensional object, but it is also possible to display the bird's-eye view image alone. That is, at least the processing of step S64 and step S65 of FIG. 6 may be performed. Specifically, image processing section 3 combines an image captured by first imaging section 7 and an image captured by second imaging section 14 into a bird's-eye view image on the basis of common mapping data. Display section 3 displays the bird's-eye view image. According to such a configuration, the continuity of a display image is maintained before and after a combination boundary of the bird's-eye view image, and thus it is possible to prevent a driver from feeling a sense of discomfort and to prevent the generation of a blind spot and the disappearance of the three-dimensional object located at the combination boundary of the bird's-eye view image after detecting the three-dimensional object.

In addition, in this embodiment, since a case of a vehicle having a steering wheel on its right hand side is assumed, a three-dimensional object in the vicinity of a left front corner, which is likely to become a blind spot to the driver, is prevented from disappearing on the bird's-eye view image, using second imaging section 14 and left front corner sonar unit 12a which are provided at the left front corner. On the other hand, in a case of a vehicle having a steering wheel on its left hand side, an object is located on the right front side rather than the left front side. That is, in the case of a vehicle having a steering wheel on its left hand side, an installation position of second imaging section 14 in this embodiment is replaced by the right front corner, and left front corner sonar unit 12a is replaced by front corner sonar unit 12b.

That is, second imaging section 14 captures an image of a front corner in a direction opposite to the position of the steering wheel of a host vehicle among four corners of the host vehicle. The detection range of sonar section 12 detecting a three-dimensional object, which is present at the front corner in a direction opposite to the position of the steering wheel of the host vehicle, is included within the angle of view of second imaging section 14. When sonar section 12 detects the three-dimensional object, image processing section 3 creates a bird's-eye view image by combining the image captured by first imaging section 7 and the image captured by second imaging section 14 and may set the detection range of sonar section 12 to be within a region of the bird's-eye view image based on the image captured by second imaging section 14 in the bird's-eye view image. On the other hand, when sonar section 12 has not detected the three-dimensional object which is present at the front corner in the direction opposite to the position of the steering wheel of the host vehicle, image processing section 3 creates a bird's-eye view image by combining the images captured by first imaging section 7.

Meanwhile, in this embodiment, sonar units which detect three-dimensional objects located at the front and back of a vehicle in sonar section 12 are formed of four sonar units 12e to 12f, but at least two sonar units may be provided in order to detect the three-dimensional objects located at the front and back of the vehicle.

In addition, in this embodiment, although sonar section 12 is used as a three-dimensional object detecting section for detecting a three-dimensional object, any means such as an infrared sensor may be used as long as it is a sensor that detects a three-dimensional object.

Embodiment 2

Next, a drive assistance apparatus according to Embodiment 2 of the present invention will be described with reference to the accompanying drawings. A description similar to that in Embodiment 1 will be given the same reference numerals and signs, and the detailed description thereof will be omitted.

Figure 10:
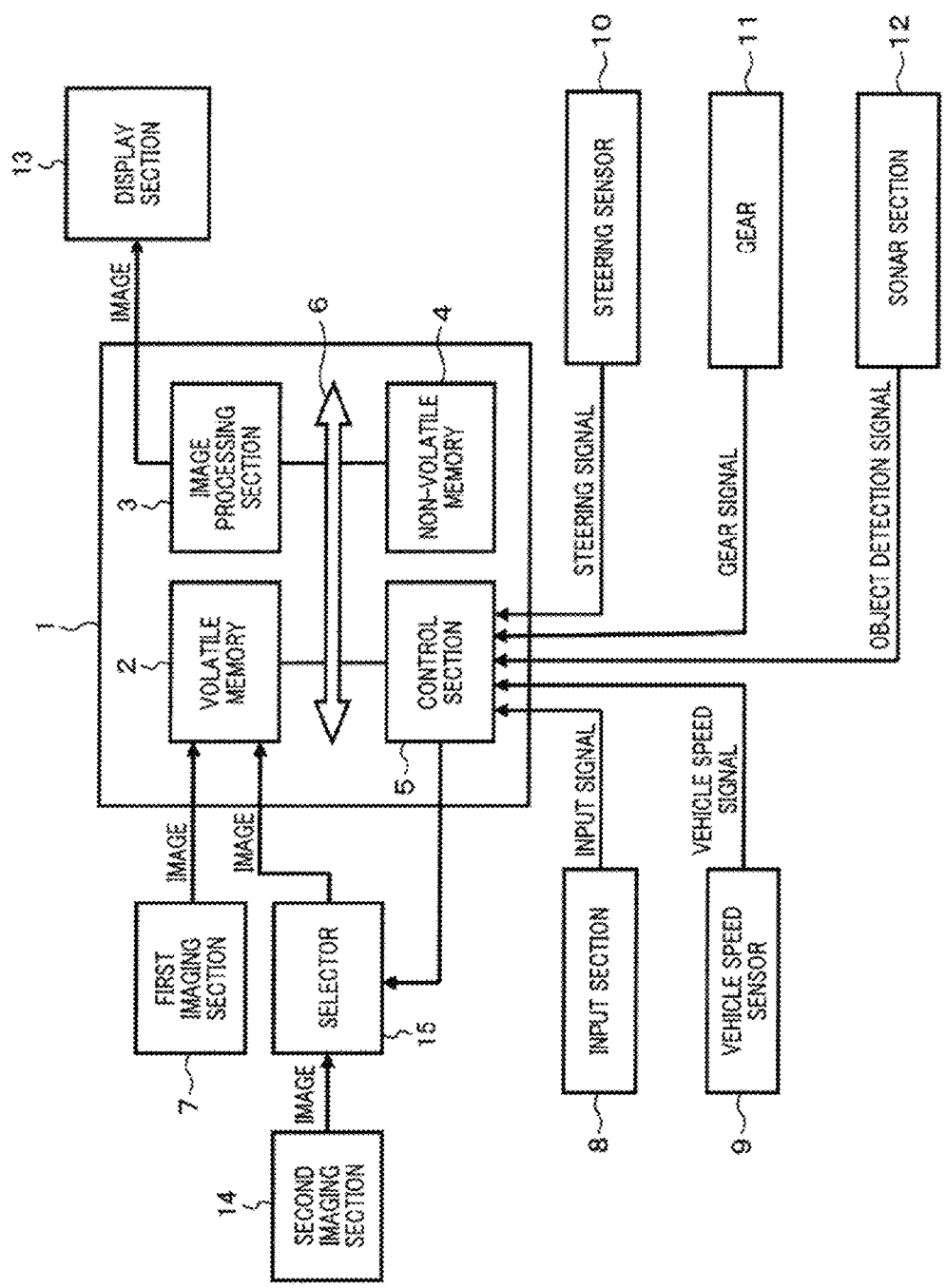
FIG. 10 is a block diagram illustrating a configuration of a drive assistance apparatus according to Embodiment 2 of the present invention.

FIG. 10 is a block diagram illustrating a configuration of the drive assistance apparatus according to Embodiment 2 of the present invention. In FIG. 10, drive assistance apparatus 1 further includes selector 15 with respect to the drive assistance apparatus of Embodiment 1. Drive assistance apparatus 1 is connected to second imaging section 14 through selector 15. Selector 15 may also be included in drive assistance apparatus 1. Volatile memory 2 is connected to second imaging section 14 through selector 15. Control section 5 controls selector 15 based on a signal input from sonar section 12 and selects second imaging section 14.

Second imaging section 14 includes four cameras. First imaging section 7 and second imaging section 14 input images captured at every predetermined time to volatile memory 2 of drive assistance apparatus 1. Second imaging section 14 is mounted to each of four corners of a vehicle body of a host vehicle. The position at which second imaging section 14 is mounted to the vehicle body will be described below.

Figure 11:
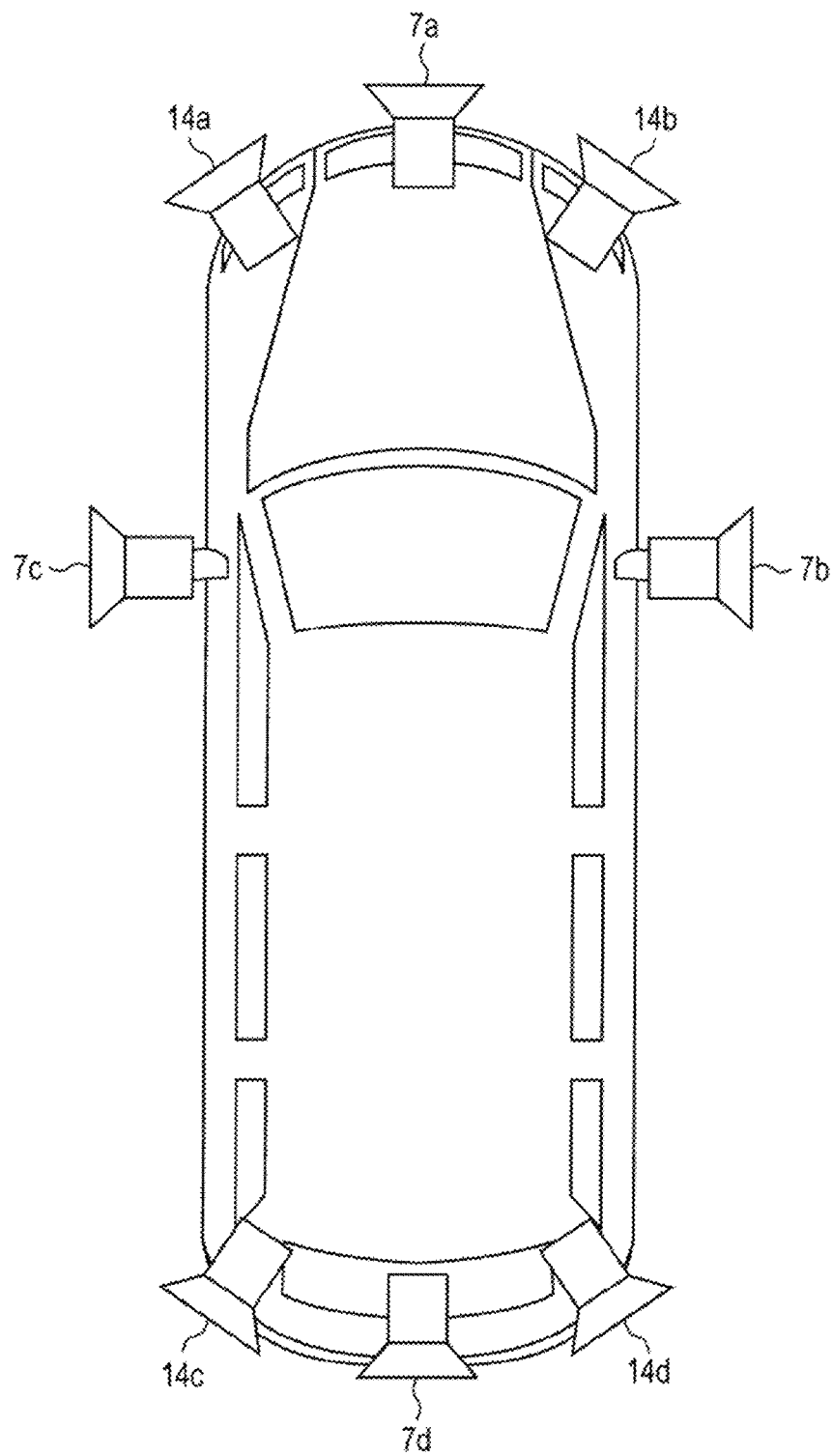
FIG. 11 is a diagram illustrating the positions at which first and second imaging sections are mounted to a vehicle according to Embodiment 2 of the present invention.

FIG. 11 is a diagram illustrating the positions at which first imaging section 7 and second imaging section 14 are mounted to a vehicle. As illustrated in FIG. 11, second imaging section 14 includes left front corner camera 14a, right front corner camera 14b, left rear corner camera 14c, and right rear corner camera 14d. Selector 15 selects one of left front corner camera 14a, right front corner camera 14b, left rear corner camera 14c, and right rear corner camera 14d on the basis of a command of control section 5. An image captured by the selected camera is input to volatile memory 2 of drive assistance apparatus 1 at every predetermined time.

Sonar section 12 includes four sonar units which are mounted to four corners of the vehicle body of the host vehicle, respectively. The positions at which the sonar units of sonar section 12 are mounted to the vehicle body will be described below.

Figure 12:
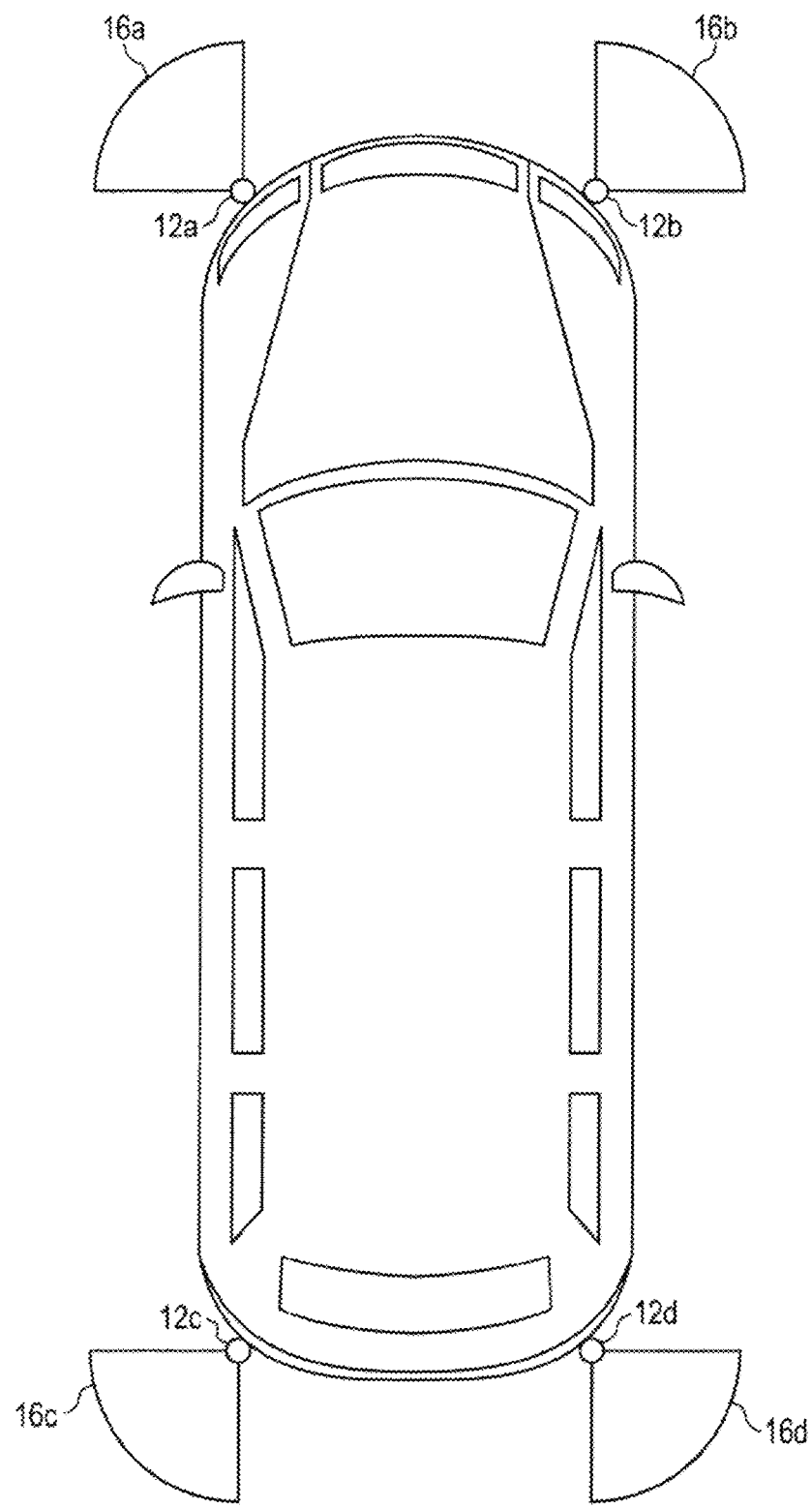
FIG. 12 is a diagram illustrating the positions at which sonar units are mounted to a vehicle according to Embodiment 2 of the present invention.

FIG. 12 is a diagram illustrating the positions at which the sonar units of sonar section 12 are mounted to a vehicle, respectively. As illustrated in FIG. 12, sonar section 12 includes left front corner sonar unit 12a, right front corner sonar unit 12b, left rear corner sonar unit 12c, and right rear corner sonar unit 12d. As illustrated in FIG. 12, respective horizontal detection ranges 16a to 16d of left front corner sonar unit 12a, right front corner sonar unit 12b, left rear corner sonar unit 12c, and right rear corner sonar unit 12d are each set to equal to or less than 180 degrees.

Figure 13:
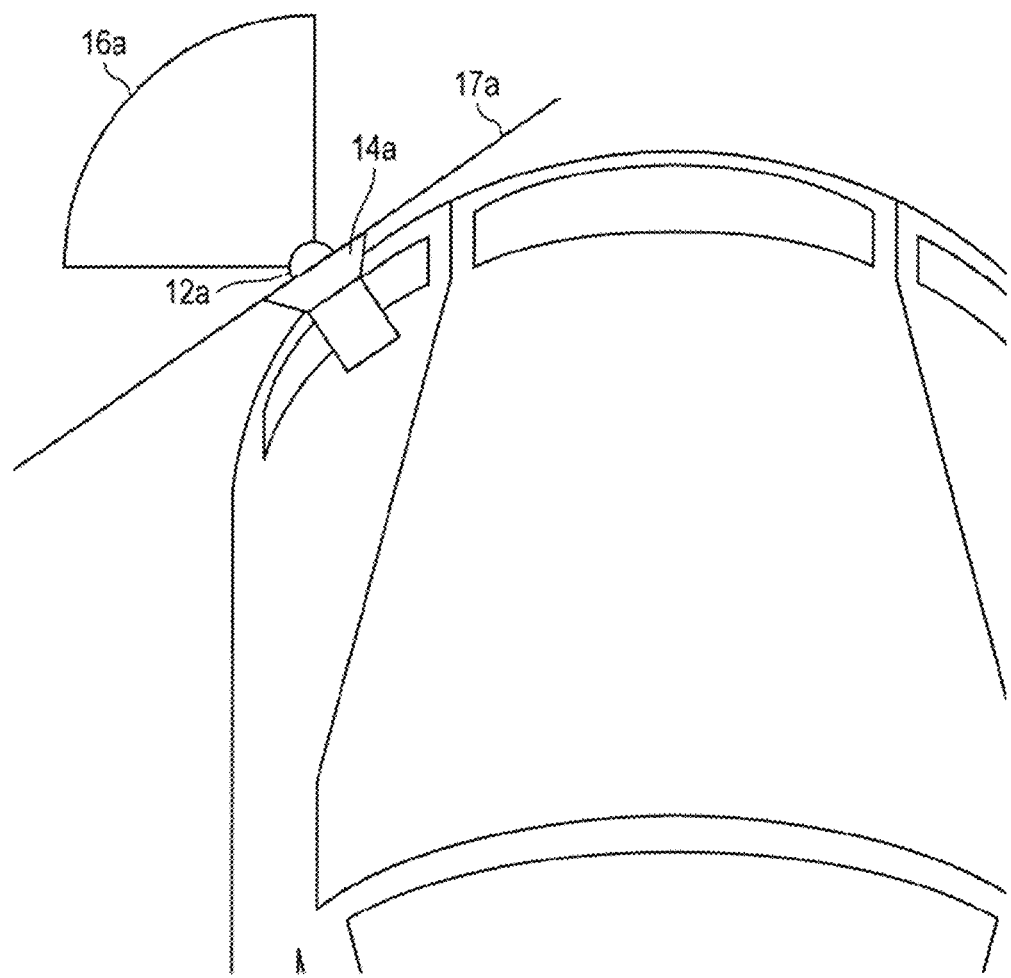
FIG. 13 is a diagram illustrating an angle of view of the second imaging section and a detection range of the sonar unit according to Embodiment 2 of the present invention in a horizontal plane.

FIG. 13 is a diagram illustrating an angle of view of left front corner camera 14a and a horizontal detection range of left front corner sonar unit 12a. As illustrated in FIG. 13, a relation between a detection range of sonar section 12 and an angle of view of second imaging section 14 is similar to the relation shown in FIG. 4 of Embodiment 1. That is, the angle of view 17a of left front corner camera 14a is set to approximately 180 degrees in a horizontal plane. Detection range 16a of left front corner sonar unit 12a is included within the angle of view 17a of left front corner camera 14a. That is, the entirety of detection range 16a of left front corner sonar unit 12a is included within the angle of view 17a of left front corner camera 14a. Similarly to Embodiment 1, it is preferable that left front corner camera 14a be mounted further upward of the vehicle body than left front corner sonar unit 12a. In addition, it is preferable that optical axes of front corner camera 14a and left front corner sonar unit 12a be substantially equal to each other.

Meanwhile, in FIG. 13, as an example, the relation between the detection range of sonar section 12 and the angle of view of second imaging section 14 has been described using the angle of view of left front corner camera 14a and the detection range of left front corner sonar unit 12a, but a similar relation is established with respect to four corners of another vehicle. That is, the detection ranges of right front corner sonar unit 12b, left rear corner sonar unit 12c, and right rear corner sonar unit 12d are included within the angles of view of right front corner camera 14b, left rear corner camera 14c, and right rear corner camera 14d, respectively.

Figure 14:
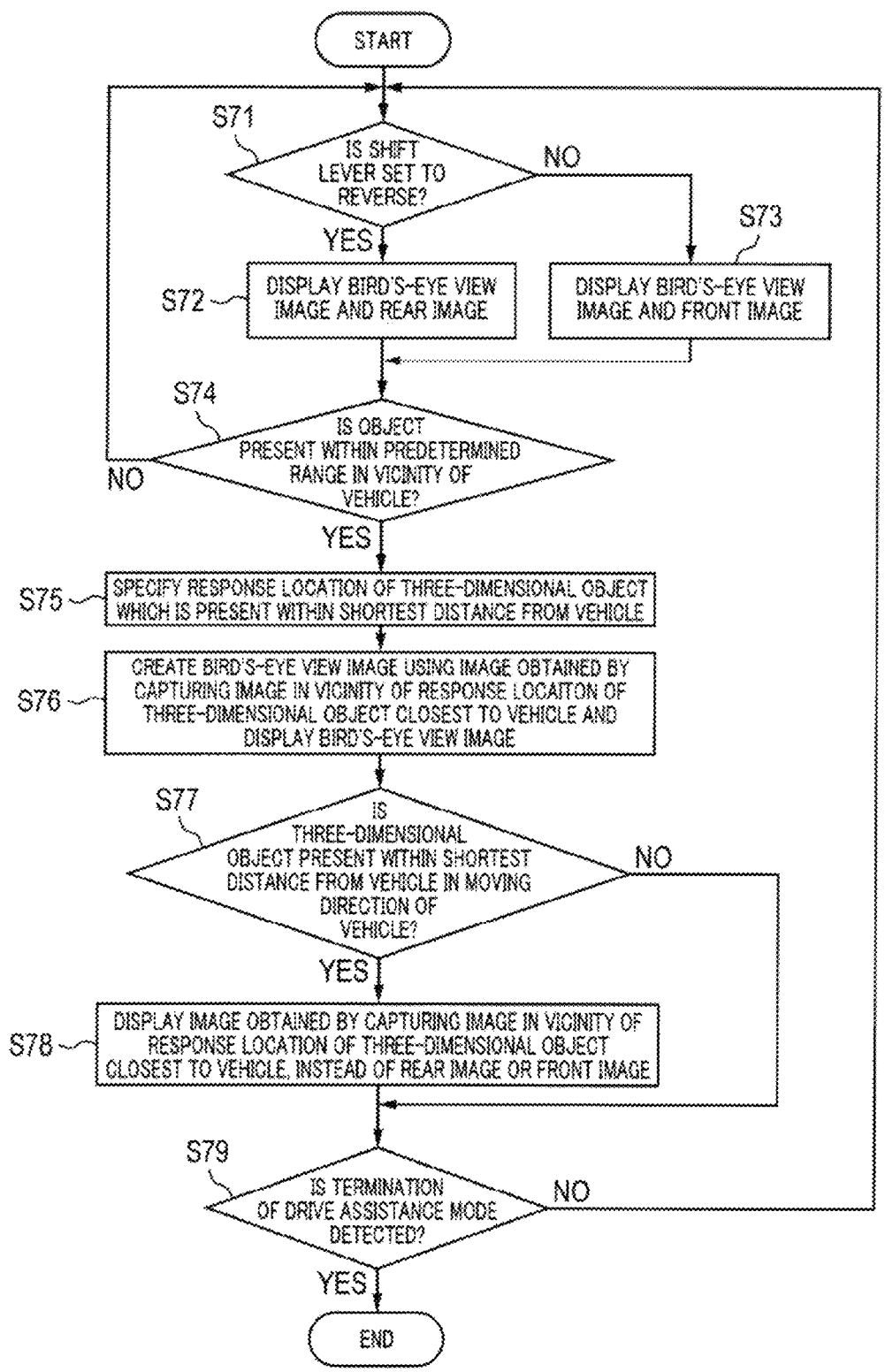
FIG. 14 is a flowchart illustrating drive assistance processing using the drive assistance apparatus according to Embodiment 2 of the present invention.

Next, the drive assistance processing using control section 5 will be described. FIG. 14 is a flowchart illustrating the drive assistance processing using control section 5. The processing of step S71 to step S73 is similar to that of corresponding step S61 to step S63 of FIG. 6 of Embodiment 1. In step S74, control section 5 determines whether a three-dimensional object is present within a predetermined range in the vicinity of a host vehicle, from detected results of sonar section 12. In a case of NO in step S74, the processing of step S71 is performed again. On the other hand, in a case of YES in step S74, as shown in step S75, control section 5 specifies a response location of a three-dimensional object which is present within a shortest distance from a host vehicle. That is, when the number of sonar units detecting a three-dimensional object is one, among sonar units 12a to 12d provided at four corners of the host vehicle, control section 5 determines that the corner at which the sonar unit detecting the three-dimensional object is disposed is the response location of the three-dimensional object. On the other hand, when the number of sonars detecting a three-dimensional object is two or more, among sonars 12a to 12d provided at four corners of the host vehicle, control section 5 determines that the corner at which the sonar detecting a three-dimensional object closest to the host vehicle is disposed is the response location of the three-dimensional object, on the basis of distance signals of the host vehicle and the three-dimensional object which are received from sonar section 12.

Next, as shown in step S76, image processing section 3 newly creates a bird's-eye view image using not only an image captured by first imaging section 7 but also an image obtained by capturing the vicinity of the response location of the three-dimensional object closest to the host vehicle which is specified in step S75 and causes display section 13 to display the created bird's-eye view image. That is, image processing section 3 creates the bird's-eye view image using images captured by four cameras 7a to 7d of first imaging section 7 and an image captured by a camera of sonar section 12 which corresponds to the response location of the three-dimensional object specified in step S75, among cameras 14a to 14d of second imaging section 14. Differences between the bird's-eye view image created in step S76 and an ordinary bird's-eye view image created by the images captured by four cameras 7a to 7d of first imaging section 7 are similar to the differences described in Embodiment 1, and thus the detailed description thereof will be omitted.

Next, as shown in step S77, control section 5 determines whether a three-dimensional object is present in the moving direction of a host vehicle within a shortest distance from the vehicle. At this time, control section 5 specifies the moving direction of the host vehicle on the basis of a gear signal input from gear 11. That is, control section 5 specifies, from a gear signal, that the moving direction of the vehicle is the forward direction when the shift lever is set to the front and that the moving direction of the vehicle is the backward direction when the shift lever is set to the reverse. In addition, control section 5 compares the specified moving direction and the response location of the three-dimensional object in step S75 to perform the determination of step S77. That is, when the shift lever is set to the front and the moving direction of the vehicle is the forward direction, control section 5 determines, from the gear signal, whether the response location of the three-dimensional object specified in step S75 is located on the left front side or the right front side. On the other hand, when the shift lever is set to the reverse and the moving direction of the vehicle is the backward direction, control section 5 determines, from the gear signal, whether the three-dimensional object reaction location specified in step S75 is located on the left rear side or the right rear side.

In a case of YES in step S77, as shown in step S78, control section 5 causes display section 13 to display the image captured by the camera which captures an image of the vicinity of the response location of the three-dimensional object closest to the host vehicle which is specified in step S65, in second imaging section 14, instead of the rear image displayed in parallel on display section 13 by step S72 or the front image displayed in parallel on display section 13 by step S73. After the processing of step S78, or in a case of NO in step S77, the processing of step S79 is performed. The processing of step S79 is similar to that of step S68 of FIG. 6 of Embodiment 1, and thus the description thereof will be omitted.

As described above, according to the present invention, the detection ranges of sonar unit 12a to sonar unit 12d are included within the angles of view of corner camera 14a to corner camera 14d, respectively. When sonar unit 12a to sonar unit 12d detect a three-dimensional object, a corner camera corresponding to the sonar detecting a three-dimensional object closest to a vehicle is selected by selector 15. Image processing section 3 creates bird's-eye view image 40b by combining an image captured by the selected corner camera and images captured by four cameras 7a to 7d of first imaging section 7 and causes a detection range of the sonar unit to be within a region of the bird's-eye view image based on the image captured by the corner camera in bird's-eye view image 40b. That is, image processing section 3 moves a blind spot of the three-dimensional object outside the detection range of sonar section 12. Therefore, although sonar section 12 detects a three-dimensional object, it is possible to prevent the three-dimensional object in the close proximity of a host vehicle from disappearing on a bird's-eye view image of display section 13.

INDUSTRIAL APPLICABILITY

The drive assistance apparatus of the present invention is useful in that, when a three-dimensional object located at one of four corners of a host vehicle is detected using a sonar unit in particular, the driving assistance apparatus displays the three-dimensional object on a bird's-eye view image without disappearance of the three-dimensional object, which in turn, allows the driver to easily realize the three-dimensional object.

REFERENCE SIGNS LIST

1 Drive assistance apparatus
3 Image processing section
5 Control section
7 First imaging section
12 Sonar section
14 Second imaging section

The invention claimed is:

1. A control method for a control device mounted in a vehicle, the control device connected to
a first camera, a second camera, a third camera, a fourth camera, a sensor, and a display,
the first camera capturing first images of first ambient view at a first out portion of the vehicle,
the second camera capturing second images of second ambient view at a second out portion of the vehicle,
the third camera capturing third images of third ambient view at a third out portion of the vehicle,
the fourth camera capturing fourth images of fourth ambient view at a fourth out portion of the vehicle, the first out portion of the vehicle being distinct from the second out portion, the third out portion, or the fourth out portion of the vehicle, the second out portion of the vehicle being distinct from the third out portion or the fourth out portion of the vehicle, the third out portion of the vehicle being distinct from the fourth out portion of the vehicle,
the sensor having a detection area at the second out portion of the vehicle, and configured to detect a three-dimensional object within the detection area, and
the display located in the vehicle,
the control method comprising:
displaying a first one image on a screen of the display, when the sensor does not detect the three-dimensional object at the second out portion of the vehicle; and
displaying a second one image on the screen of the display, the second one image having at least a first region, a second region, a third region, and a fourth region on the screen of the display, the first region corresponding to one of the first images, the second region corresponding to one of the second images, the third region corresponding to one of the third images, the fourth region corresponding to one of the fourth images, the second region of the second one image including at least a part of the detection area of the sensor, the second region of the second one image including at least a part of the three-dimensional object, when the sensor detects the three-dimensional object at the second out portion of the vehicle,
wherein the first one image excludes the second images of the second ambient view at the second out portion of the vehicle, each of the second images including the at least part of the detection area of the sensor, the second images captured by the second camera.

2. The control method according to claim 1, wherein a first position of the sensor on the second out portion of the vehicle corresponds to a second position of the second camera on the second out portion of the vehicle.

3. The control method according to claim 2, wherein a first center axis the sensor corresponds to a second center axis of the second camera.

4. The control method according to claim 1, wherein the first one image comprises a first bird's-eye view image combined with at least one of the first images, one of the third images, and one of the fourth images.

5. The control method according to claim 4, wherein the first one image includes an image of the vehicle on a center of the first bird's-eye view image.

6. The control method according to claim 1, wherein the second one image comprises a second bird's-eye view image combined with at least one of the first images, one of the second images, one of the third images, and one of the fourth images.

7. The control method according to claim 6, wherein the second one image includes an image of the vehicle on a center of the second bird's-eye view image.

8. The control method according to claim 1, wherein the control device comprises a processor.

9. The control method according to claim 1, wherein an angle of view of the second camera is set to 180 degrees in a horizontal plane.

10. The control method according to claim 1, wherein the detection area of the sensor is set to be equal to or less than 180 degrees in a horizontal plane.

11. A control device configured to be mounted in a vehicle, the control device comprising:
an input configured to be connected to a first camera, a second camera, a third camera, a fourth camera, and a sensor,
the first camera being configured to capture first images of first ambient view at a first out portion of the vehicle,
the second camera being configured to capture second images of second ambient view at a second out portion of the vehicle,
the third camera being configured to capture third images of third ambient view at a third out portion of the vehicle,
the fourth camera being configured to capture fourth images of fourth ambient view at a fourth out portion of the vehicle, the first out portion of the vehicle being distinct from the second out portion, the third out portion, or the fourth out portion of the vehicle,
the second out portion of the vehicle being distinct from the third out portion or the fourth out portion of the vehicle, the third out portion of the vehicle being distinct from the fourth out portion of the vehicle,
the sensor having a detection area at the second out portion of the vehicle, and being configured to detect a three-dimensional object within the detection area;
an output configured to be connected with a display located in the vehicle, wherein:
when the sensor does not detect the three-dimensional object at the second out portion of the vehicle, the control device displays a first one image on a screen of the display;
when the sensor detects the three-dimensional object at the second out portion of the vehicle, the control device displays a second one image on the screen of the display, the second one image having at least a first region, a second region, a third region, and a fourth region on the screen of the display, the first region corresponding to one of the first images, the second region corresponding to one of the second images, the third region corresponding to one of the third images, the fourth region corresponding to one of the fourth images, the second region of the second one image including at least a part of the detection area of the sensor, the second region of the second one image including at least a part of the three-dimensional object; and
the first one image excludes the second images of the second ambient view at the second out portion of the vehicle, each of the second images including the at least part of the detection area of the sensor, the second images captured by the second camera.

12. The control device according to claim 11, wherein a first position of the sensor on the second out portion of the vehicle corresponds to a second position of the second camera on the second out portion of the vehicle.

13. The control device according to claim 12, wherein a first center axis the sensor corresponds to a second center axis of the second camera.

14. The control device according to claim 11, wherein the first one image comprises a first bird's-eye view image combined with at least one of the first images, one of the third images, and one of the fourth images.

15. The control device according to claim 14, wherein the first one image includes an image of the vehicle on a center of the first bird's-eye view image.

16. The control device according to claim 11, wherein the second one image comprises a second bird's-eye view image combined with at least one of the first images, one of the second images, one of the third images, and one of the fourth images.

17. The control device according to claim 16, wherein the second one image includes an image of the vehicle on a center of the second bird's-eye view image.

18. The control device according to claim 11, further comprising a processor.

19. The control device according to claim 11, wherein an angle of view of the second camera is set to 180 degrees in a horizontal plane.

20. The control device according to claim 11, wherein the detection area of the sensor is set to be equal to or less than 180 degrees in a horizontal plane.

* * * * *